US012302941B2

(12) United States Patent
Soltow

(10) Patent No.: US 12,302,941 B2
(45) Date of Patent: May 20, 2025

(54) PRODUCTION MACHINE FOR PRODUCING ROD-SHAPED PRODUCTS FROM AN ENDLESS STRAND OF A STRIP ADHESIVELY BONDED TO FORM A TUBE

(71) Applicant: KÖRBER TECHNOLOGIES GMBH, Hamburg (DE)

(72) Inventor: Ralf Soltow, Reinbek (DE)

(73) Assignee: KÖRBER TECHNOLOGIES GMBH, Hamburg (DE)

( * ) Notice: Subject to any disclaimer, the term of this patent is extended or adjusted under 35 U.S.C. 154(b) by 364 days.

(21) Appl. No.: 17/797,228

(22) PCT Filed: Oct. 23, 2020

(86) PCT No.: PCT/EP2020/079908
§ 371 (c)(1),
(2) Date: Aug. 3, 2022

(87) PCT Pub. No.: WO2021/155965
PCT Pub. Date: Aug. 12, 2021

(65) Prior Publication Data

US 2023/0068917 A1 Mar. 2, 2023

(30) Foreign Application Priority Data

Feb. 4, 2020 (DE) ..................... 10 2020 102 744.3

(51) Int. Cl.
*A24C 5/24* (2006.01)
*A24C 5/46* (2006.01)
(Continued)

(52) U.S. Cl.
CPC .................. *A24C 5/24* (2013.01); *A24C 5/46* (2013.01); *A47G 21/18* (2013.01); *B31C 5/00* (2013.01); *B31D 5/0095* (2013.01)

(58) Field of Classification Search
CPC . A24C 5/24; A24C 5/46; A47G 21/18; G01N 29/11
See application file for complete search history.

(56) References Cited

U.S. PATENT DOCUMENTS

| | | | | |
|---|---|---|---|---|
| 5,531,233 | A | 7/1996 | Oglesby et al. | |
| 6,758,906 | B2 | 7/2004 | Maiwald et al. | |
| 2007/0034008 | A1 * | 2/2007 | Voss ...................... | G01N 29/27 73/570 |

FOREIGN PATENT DOCUMENTS

| | | | |
|---|---|---|---|
| CN | 103564654 | A | 2/2014 |
| CN | 103783663 | A | 5/2014 |

(Continued)

OTHER PUBLICATIONS

DE202012005938U1_Espacenet Machine English Trans_Retrieved Oct. 25, 2024 (Year: 2012).*

(Continued)

*Primary Examiner* — Christopher M Rodd
*Assistant Examiner* — Ronnie Kirby Jordan
(74) *Attorney, Agent, or Firm* — SALIWANCHIK, LLOYD & EISENSCHENK

(57) ABSTRACT

The invention relates to a production machine for producing rod-shaped products from a continuous strand of a continuous strip adhesively bonded to form a tube, comprising a device for applying a glue track to a strip, a format portion, in which the continuous strip into the continuous strand by shaping and adhesive bonding, and a cutting device which cuts the rod-shaped products from the continuous strand at a predetermined length, wherein the device for applying the glue track is formed by a device which applies the glue intermittently to form glue-free portions arranged at regular intervals, and a sensor apparatus is provided, which is directed towards the continuous strip or the continuous strand and generates a signal depending on the passage of a (Continued)

glue-free portion, and the device for applying the glue track is designed to change the length of the glue-free portions in the longitudinal direction of the glue track.

13 Claims, 3 Drawing Sheets

(51) Int. Cl.

| | |
|---|---|
| ***A47G 21/18*** | (2006.01) |
| ***B31C 5/00*** | (2006.01) |
| ***B31D 5/00*** | (2017.01) |

(56) References Cited

FOREIGN PATENT DOCUMENTS

| | | | | | |
|---|---|---|---|---|---|
| CN | 105266192 | A | | 1/2016 | |
| CN | 110353301 | A | | 10/2019 | |
| CN | 209649638 | A | | 11/2019 | |
| CN | 209649638 | U | * | 11/2019 | ............... B31D 5/00 |
| DE | 198 42 266 | A1 | | 3/2000 | |
| DE | 202012005938 | U1 | * | 8/2012 | ............... A24C 5/24 |
| DE | 102014213858 | B3 | * | 11/2015 | ............... A24C 5/24 |
| EP | 1 731 045 | A1 | | 12/2006 | |
| EP | 1 750 124 | A1 | | 2/2007 | |
| EP | 2 505 269 | A2 | | 10/2012 | |
| EP | 2 692 250 | A1 | | 2/2014 | |
| EP | 2 801 266 | A2 | | 11/2014 | |
| EP | 3 235 388 | A1 | | 10/2017 | |
| IT | MI991911 | A1 | | 3/2001 | |

OTHER PUBLICATIONS

DE102014213858B3_Espacenet Machine English Translation_ Retrieved Dec. 18, 2024 (Year: 2015).*

CN209649638U_Espacenet Machine English Trans_Retrieved Oct. 24, 2024 (Year: 2019).*

Examination Report issued by the Chinese Patent Office dated Jul. 11, 2024 with respect to the Chinese priority application No. 202080095589.1.

Examination Report issued by the European Patent Office dated Aug. 2, 2023 with respect to parallel European patent application No. 20 799 650.5.

First Examination Report issued by the German Patent and Trademark Office with respect to the German priority application No. 10 2020 102 744.3.

Hou, Zhiwi, book entitled "Building Electrical Drawings and Engineering Examples," published by China Electric Power Press on Mar. 31, 2007, 136 pages cited in an Examination Report issued by the Chinese Patent Office on Jan. 6, 2025 in parallel Chinese patent application No. 202080095589.1 with an English translation of the information regarding the book and category of the newly cited reference.

* cited by examiner

PRODUCTION MACHINE FOR PRODUCING ROD-SHAPED PRODUCTS FROM AN ENDLESS STRAND OF A STRIP ADHESIVELY BONDED TO FORM A TUBE

CROSS REFERENCE TO RELATED APPLICATIONS

This application is a National Stage Application of International Application Number PCT/EP2020/079908, filed Oct. 23, 2020; which claims priority to German Patent Application No. 10 2020 102 744.3, filed Feb. 4, 2020.

FIELD OF INVENTION

The invention relates to a production machine for producing rod-shaped products from a continuous strand of a strip adhesively bonded to form a tube, and a method for producing rod-shaped products using the production machine, and a product that is cut from a continuous strand of a continuous strip adhesively bonded to form a tube.

BACKGROUND OF THE INVENTION

Such a strip can be, for example, a paper strip or a wrapping strip, as is used, for example, in devices for producing products in the tobacco processing industry, such as cigarettes or filter segments. The paper strip or wrapping strip is supplied to the device in the form of a continuous strip and is, for example, provided with a glue track on one of the edges by means of a device and then folded over to form a tube in a shaping portion and finally adhesively bonded at the edges to form a continuous tubular strand. Depending on the use, a continuous strip of filter material or tobacco fibres can be placed before the shaping process, which strip then fills the cavity in the tubular strand. Another application is the production of drinking straws, in which slightly stiffer strips are deliberately used, which strips are made of a food-grade material and from which tubular drinking straws are cut to a predetermined length by means of a cutting device after the shaping process and adhesive bonding.

In general, by means of the production machine according to the invention, tubular segments of a predetermined length can be cut from a tubular continuous strand.

A device used in such a superordinate production machine for applying a glue track to a continuous strip is known, for example, from DE 10 2014 213 858 B3.

The device for applying the glue track comprises a nozzle held on the device, by means of which a glue track is applied to a roller which is rotationally driven to perform a rotary movement and in turn applies or rubs the glue track onto one of the edges of the strip. Depending on the type of adhesive bonding, the glue track can be applied only to one edge of the strip with a width of 1 or 2 mm or over the entire width of the strip, e.g. with a width of 5 to 35 mm or 5 to 28 mm. The nozzle is arranged eccentrically with respect to the axis of rotation of the roller at a distance of 0.05 to 0.15 mm. As a result, an accumulated glue reservoir forms at the opening of the nozzle, in an intermediate space with respect to the roller, the volume of which glue reservoir can be changed via the distance of the nozzle, the volume flow of the discharging glue and the speed of the roller, i.e. the removal of the glue. The advantage of this solution can be seen in the fact that, prior to application to the strip, the glue is distributed on the roller by rubbing to form a glue track of constant width and thickness, such that the glue track applied to the strip is of significantly improved quality in terms of the thickness and width to be maintained.

After the glue track has been applied, the glue track dries out automatically, with drying being additionally supported or ensured by a heat source directed towards the glue track or the subsequently produced adhesive seam of the fixed-shape tubular strand or by a drying section which is to be passed through, until the products are finally cut from the continuous strand at a predetermined length by means of the cutting device.

Since the products are cut from a continuous strand and the glue track is also applied to the strip as a continuous glue track and adhesively bonded to form a continuous adhesive seam, the cutting device necessarily cuts through the adhesive seam when cutting the products from the continuous strand. This can lead to smaller particles of the glue mixed with particles from grinding of the blades or dust from the surroundings adhering to the blade of the cutting device when the strand is cut, particularly if the adhesive seam has not yet completely dried. These adhering particles can subsequently degrade the quality of the cut surface of the products or generally soil the products to be cut and are also referred to as so-called “black particles”.

BRIEF SUMMARY OF THE INVENTION

Against this background, the problem addressed by the invention is that of providing a production machine and a method which allow the products to be cut while avoiding the disadvantages explained at the outset and with an improved quality of the products. The problem addressed by the invention is also that of providing a rod-shaped product cut from a continuous strand of a continuous strip adhesively bonded to form a tube an improved quality of the cut surface.

In order to solve the problem, a production machine and a method are proposed. Furthermore, a rod-shaped product is proposed which is cut from a continuous strand of a continuous strip adhesively bonded to form a tube. Further preferred embodiments can be found in the drawings and the associated description.

According to the basic concept of the invention, the device for applying the glue track in the production machine is formed by a device which applies the glue intermittently to form glue-free portions arranged at regular intervals, and a sensor apparatus is provided which is directed towards the continuous strip or the continuous strand and generates a signal depending on the passage of a glue-free portion, and the device for applying the glue is designed to adjust and/or change the length of the glue-free portions in the longitudinal direction of the glue track.

In one embodiment the subject invention provides:

A production machine (1) for producing rod-shaped products (3) from a continuous strand (9) of a continuous strip (2) adhesively bonded to form a tube, comprising:

- a device (15) for applying a glue track (13) to a strip (2),
- a format portion (10), in which the continuous strip (2) can be formed into the continuous strand (9) by shaping and adhesive bonding, and
- a cutting device (4) which cuts the rod-shaped products (3) from the continuous strand (9) at a predetermined length, characterised in that

- the device (15) for applying the glue track (13) is formed by a device (15) which applies the glue intermittently to form glue-free portions (14) arranged at, in particular regular, intervals, and a sensor apparatus (7) is provided, which is directed towards the continuous strip (2) or the continuous strand (9) and generates a signal depending on the passage of a glue-free portion (14), and the device (15) for applying the glue track (13) is designed to adjust and/or change the length of the glue-free portions (14) in the longitudinal direction of the glue track (13).

By means of the proposed solution, the length of the glue-free portions in the longitudinal direction of the glue track can be adjusted in a targeted manner in such a way that said glue-free portions have a predetermined optimised length. In particular, not only the length but also the arrangement of the glue-free portions, i.e. the distances of the glue-free portions from one another, can be adjusted such that the cutting device cuts the rod-shaped products from the continuous strand by a cut through the glue-free portions. The maintenance of the length and in particular the position of the portions relative to one another can then be monitored by the signal from the sensor apparatus, it being possible for the signal to also be used to adjust the arrangement and the length of the glue-free portions when the device is started up. The signal from the sensor apparatus can be displayed or made perceptible, for example by means of a suitable display device, during a manual adjustment of the device for applying the glue track, such that an operator can then adjust the length and position of the glue-free portions in the glue track taking into account the signal from the sensor apparatus. Furthermore, the proposed intermittent glue application has the advantage of an improved application pattern of the glue track in general, since the glue at the outlet opening of the nozzles is regularly completely removed by interrupting the glue supply at regular time intervals. This can prevent the formation of the glue drips at the outlet opening, which are disadvantageous for the application pattern of the glue track.

According to a further development, it is proposed that the device for applying the glue has a controller for adjusting and/or changing the duration of the interruption, i.e. the cycle of the glue application. By adjusting and/or changing the length of the interruption of the glue application, the length of the glue-free portions in the glue track is changed directly in connection with the transport speed of the strip. The cycle can be controlled in such a way that the glue-free portions themselves have a predetermined length, and the cycle can also be controlled in such a way that the glue-free portions are at a distance from one another that corresponds to the length of the products to be cut off. This ensures that the cutting device, the cutting frequency of which is also adjusted to the length of the products to be cut off, cuts through the glue-free portions in each case during cutting and is therefore not soiled by the glue.

Furthermore, the length and/or position of the glue-free portions can alternatively or additionally be changed by the device for applying the glue having a nozzle, the distance of which from the glue track to be applied can be changed. Due to the variable distance of the nozzle, the application pattern of the glue track on the strip can be actively changed. The nozzle or, in the case of a plurality of nozzles, all or some of the nozzles can be disconnected from a glue supply and reconnected to the glue supply after a predefinable time interval.

In this case, the device for applying the glue can in particular have a rotationally driven roller, to which the nozzle of the device applies the glue track and which further applies the glue track to the edge of the continuous strip. The glue track is thus not applied directly to the strip by the nozzle, but first to a roller, which then applies the glue track to the strip in an improved application pattern. This allows a glue track on the strip that does not have any spills of glue that can occur when the glue track is applied directly to the strip due to a residual amount of the glue adhering to the nozzle. With the proposed solution, the glue is first rubbed on the roller to form a glue track of constant width and thickness, and only then is it applied to the strip by the roller. If the device has a change in the distance between the nozzle and the glue track, this distance is the distance between the outlet opening of the nozzle and the glue track applied to the roller, while the distance or contact between the roller and the strip is constant. Since the geometry of the glue track applied to the roller also corresponds to the geometry of the glue track applied to the strip, changing the distance between the nozzle and the roller can change both the application pattern of the glue track on the roller and the application pattern of the glue track on the strip. Since the distance between the roller and the strip or the contact is not changed, the distance between the nozzle and the strip is also indirectly changed in this case. The roller is practically just an "intermediate part" for transferring the glue discharging from the nozzle onto the strip, with respect to which the distance of the nozzle is changed.

In this case, the nozzle can preferably have an edge portion delimiting the outlet opening and protruding in the direction of the roller, which edge portion is arranged on the edge of the outlet opening that is arranged downstream with respect to the direction of rotation of the roller. The protruding edge portion on the downstream edge of the outlet opening deliberately reduces the gap width between the edge of the outlet opening and the roller, through which the glue discharging from the nozzle is removed, such that the glue at the outlet opening is deliberately accumulated to form a glue reservoir, from which the glue is then removed by the roller. The glue reservoir forms a supply from which the glue continues to be applied to the roller even if the glue supply through the nozzle is stopped or interrupted. This means that even in the case of highly viscous glue types, glue-free portions can be achieved which have a very short length of 4 mm and less, which, by means of a removal of the glue without a glue reservoir, is otherwise not possible at the high transport speeds of the continuous strand of 100 m/min and more, due to mechanical limits of the closing mechanism of the glue supply.

Alternatively or additionally, the formation of the glue reservoir can also be supported by the nozzle being arranged such that the centre of the outlet opening is eccentric to the axis of rotation of the roller, counter to the direction of rotation of the roller. The eccentricity of the nozzle reduces the distance between the roller and the edge of the outlet opening arranged downstream with respect to the direction of rotation of the roller. At the same time, the free space between the roller and the outlet opening, in which the glue reservoir is accumulated and which, with respect to the direction of rotation, is arranged upstream of the constriction between the downstream edge of the outlet opening and the roller, is increased.

It is further proposed that the roller is driven in the opposite direction with respect to a transport direction of the continuous strip. The roller is driven in such a way that the strip is guided past the roller counter to the rotational movement thereof, such that the relative speed of the strip with respect to the roller is the sum of the transport speed of the strip and the circumferential speed of the lateral surface of the roller with the glue track arranged thereon. Due to this increased relative speed of the strip with respect to the roller, the glue is rubbed onto the strip at a higher speed. As a result, the glue track on the roller is applied to the strip to form an even finer and in particular thinner glue track.

It is further proposed that the glue has a viscosity of greater than 230 mPas and in particular greater than 1,000 mPas. The glue is therefore a highly viscous glue and can therefore be applied to the strip as a glue track with a very high level of dimensional accuracy. In this way, in particular spills or other quality deficiencies in the uniformity of the glue distribution can be prevented. In addition, the use of highly viscous glues has the advantage that the glue track cures or dries more quickly after the edges of the strip have been adhesively bonded, such that the drying section to be traversed by the continuous strand after adhesive bonding can be shorter, or additional measures for curing the adhesive seam can be measured more easily or can even be omitted. Even with these highly viscous glues, very short glue-free portions of, for example, 4 mm and less can be achieved by the glue being applied intermittently and a glue reservoir also being formed from which the glue can continue to be applied for a short distance after the glue supply has been interrupted in order to shorten the glue-free portion.

It is further proposed that the sensor apparatus is arranged between the format portion and the cutting device. With respect to the transport direction of the strand, the sensor apparatus is thus directed upstream of the cutting device towards the fixed-shape continuous strand. Since the sensor apparatus and the cutting device are arranged in a stationary manner on the production machine, the cutting device is also in a fixed spatial association with the sensor apparatus, such that the signal from the sensor apparatus, taking into account the transport speed of the strand, can also be used to determine when the glue-free portions of the adhesive seam pass the cutting device or whether the blade of the cutting device that cuts through the strand also cuts through the glue-free portions of the adhesive seam. In this case it is particularly advantageous for the shape of the strand to no longer be changed after the glue track has been adhesively bonded in the format portion, apart from the transport.

In this case, it is further proposed that the sensor apparatus is a high-frequency sensor apparatus which can also detect the glue-free portions through the layer of the tubular strand that covers the adhesive seam on the outside.

Alternatively, it is proposed that the sensor apparatus is arranged between the device for applying the glue track and the format portion. This solution has the advantage that the strand is not yet closed when it passes the sensor apparatus and the adhesive seam is therefore exposed to the outside. This makes it possible to use a simpler, more cost-effective sensor apparatus such as an optical sensor apparatus, and the glue-free portion can also be detected with greater accuracy.

Furthermore, a method is provided for operating a production machine in which the device for applying the glue track is controlled depending on the signal from the sensor apparatus in order to adjust and/or change the length of the glue-free portions.

In one embodiment the subject invention provides:

Method for operating a production machine (1) as described herein, characterised in that the device (15) for applying the glue track (13) is controlled depending on the signal from the sensor apparatus (7) in order to adjust and/or change the length of the glue-free portions (14).

The advantage of this solution can be seen in the fact that the signal from the sensor apparatus can also be used for automated or semi-automated open-loop or closed-loop control of the production machine, in which the device for applying the glue track can be controlled depending on the signal from the sensor apparatus in order to adjust and/or change the length of the glue-free portions. As a result, the orientation and length of the glue-free portions in the glue track can also be changed online, i.e. during operation of the production machine, without manual intervention being required to carry out the adjustment. The adjustment can be triggered automatically if the sensor apparatus detects a deviation of the actual value from the target value that exceeds a predetermined tolerance value. Alternatively, the adjustment can also be triggered manually but carried out automatically.

In this case, the length of the glue-free portions can preferably be adjusted and/or changed by adjusting and/or changing the duration of the interruption of the glue application and/or by adjusting and/or changing the distance of the device for applying the glue track on the strip. Furthermore, it is alternatively or additionally proposed that the production machine is designed such that an adjustment and/or the change of the length of the glue-free portions is controlled by adjusting and/or changing the speed of the roller.

As a result of the improved glue application, the process can be further improved in terms of production capacity by transporting the strip at a transport speed of more than 100 m/min, without this resulting in disadvantages for the quality of the cut surfaces and the adhesive seam.

Furthermore, in order to solve the problem, a rod-shaped product is proposed which is cut from a continuous strand of a continuous strip adhesively bonded to form a tube, the strip being adhesively bonded to form the tube using an adhesive seam interrupted by glue-free portions, and the product being cut from the strand by a cut through one of the glue-free portions. As a result of the proposed solution, the products have a higher-quality cut surface, since the cut surface is not contaminated by glue particles and grinding or dust particles adhering thereto, due to the cut through the glue-free portions. In this case, the length of the glue-free portions should be as short as possible so that the product is still adhesively bonded over the largest possible length. The glue-free portions are divided by the cut, so that the remaining length of the glue-free portions at the ends of the products is always only formed by part of the original glue-free portion, i.e. is significantly shorter.

In particular, the adhesive seam can be formed from a highly viscous glue having a viscosity of more than 230 mPas and preferably more than 1,000 mPas, as a result of which a very strong adhesive seam can be achieved with a very high level of dimensional accuracy, in particular in the region of the glue-free portions.

It is further proposed that the product is formed from a food-grade material. This makes it possible to also use the rod-shaped products generally for sucking, storing and transporting foodstuffs. For example, the products can be used as drinking straws or as packaging for food.

BRIEF DESCRIPTION OF THE FIGURES

The invention will be explained below on the basis of preferred embodiments with reference to the accompanying drawings, in which.

DETAILED DESCRIPTION

Figure 1:
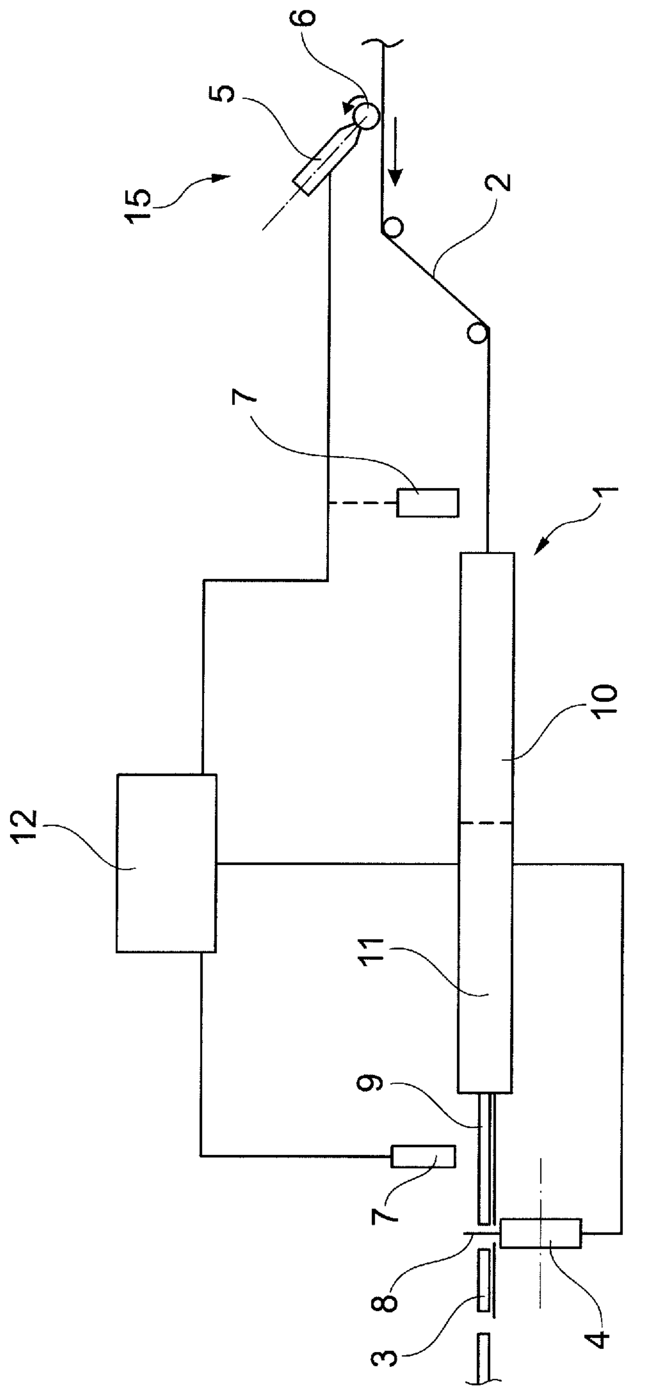
FIG. 1 is a schematic view of a device according to the invention.

FIG. 1 is a schematic view of the production machine 1 according to the invention, to which a continuous strip 2, for example in the form of a paper strip, is supplied. The strip 2 is guided past a device 15 for applying a glue track 13, which can only be seen in FIGS. 2 and 3. After the glue track 13 has been applied, the strip 2 is introduced into a format portion 10 in which the edges of the strip 2 are turned up, placed on top of one another and finally connected to one another via the glue track 13 to form an adhesive seam and fixed in shape to form a continuous tubular strand 9. The format portion 10 is followed by a drying section 11 which can be provided with additional drying units, for example heat sources. Depending on the nature of the glue and the transport speed of the strand 9, the drying section 11 is designed in such a way that, after exiting the drying section 11, the adhesive seam is dried to such an extent that it can then no longer be released. After exiting the drying section 11, the shape-fixed, tubular strand is guided past a cutting device 4 which cuts rod-shaped products 3 from the strand 9 at a predetermined length. The cutting device 4 comprises a rotating blade carrier having one or more radially projecting blades 8 which cut through the strand 9 at defined time intervals due to the rotary movement of the blade carrier and thereby cut the products 3 from the strand 9 at a predetermined length, taking into account the transport speed of the strand 9. Such products 3 can be, for example, drinking straws, prefabricated products 3 from the tobacco processing industry or prefabricated products 3 from "heat-not-burn" products or electronic cigarette products. In this respect, the production machine 1 corresponds to a production machine 1 known in the prior art.

The production machine 1 according to the invention differs from the prior art in that the device 15 for applying the glue track 13 is designed as an intermittent application device, and in that at least one sensor apparatus 7 is additionally provided, which, as will be explained in more detail below, is directed towards the strip 2 or the strand 9.

Figure 2:
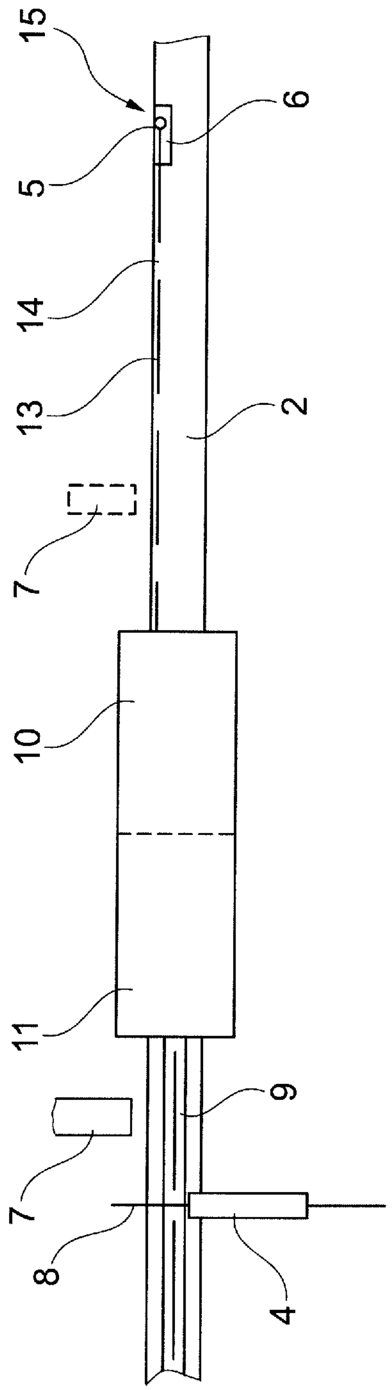
FIG. 2 shows an enlarged detail of the device with a view of the strand.

The strip 2 with the device 15 for applying the glue track 13 can be seen from above in FIG. 2. The device 15 applies the glue track 13 to the edge of the strip 2 intermittently, i.e. to form glue-free portions 14 of a predetermined length. The strip 2 is then folded over and adhesively bonded to form the tubular strand 9, the glue track 13 with the glue-free portions 14 connecting the two edges of the strip 2 in the tubular strand 9 to one another by means of a regularly interrupted adhesive seam.

The device 15 can apply the glue track 13 in different widths, up to a glue application over the entire surface of the strip 2, depending on how the adhesive bonding of the strip 2 to form the tubular strand 9 is to be implemented. A plurality of strips 2 can also be adhesively bonded in multiple layers to form a strand 9. Furthermore, a sensor apparatus 7 is provided, which is either arranged between the format portion 10 and the device 15 for applying the glue track 13 and is directed towards the edge of the strip 2 provided with the glue track 13, or is alternatively arranged between the format portion 10 and the cutting device 4 and is directed towards the adhesive seam in the strand 9. The sensor apparatus 7 is designed in such a way that it generates a signal which is dependent on the passage of a glue-free portion 14 in the glue track 13 or in the adhesive seam and allows the length of the glue-free portion 14 to be inferred. Furthermore, the sensor apparatus 7 is in a fixed spatial association with the cutting device 4, such that, taking into account the transport speed of the strip 2 or the strand 9, it is also possible to infer when the detected glue-free portions 14 pass the cutting device 4.

As can be seen in FIG. 1, a control unit 12 is also provided on the production machine 1, to which the signals from the sensor apparatus 7 are supplied. In addition, the control unit 12 is also connected in terms of signalling to the device 15 for applying the glue track 13 and the cutting device 4 and to a drive apparatus (not shown) of the strip 2 or the strand 9. The control unit 12 can also comprise a display apparatus and an input unit, which allow the display of the determined parameters and the input of corresponding control commands.

The operator can adjust the production machine 1 in a one-off adjustment process or an adjustment process which is to be repeated regularly. In this case the operator can recognize the point in time at which the glue-free portions 14 pass the cutting device 4 using the signals determined by the sensor apparatus 7, which are indicated by means of an evaluation taking into account the transport speed. The operator then adjusts the production machine 1 in such a way that the glue-free portions 14 pass the cutting device 4 precisely when the cutting device 4 cuts through the strand 9 with the blade 8. In another embodiment, the adjustment can also be made online in a fully automated closed-loop control process, i.e. during operation of the production machine 1, such that manual intervention or manual control is not required to trigger the adjustment process. The length and position of the glue-free portions 14 in the glue track 13 are adjusted by controlling the device 15, as will be explained in more detail below.

Figure 3:
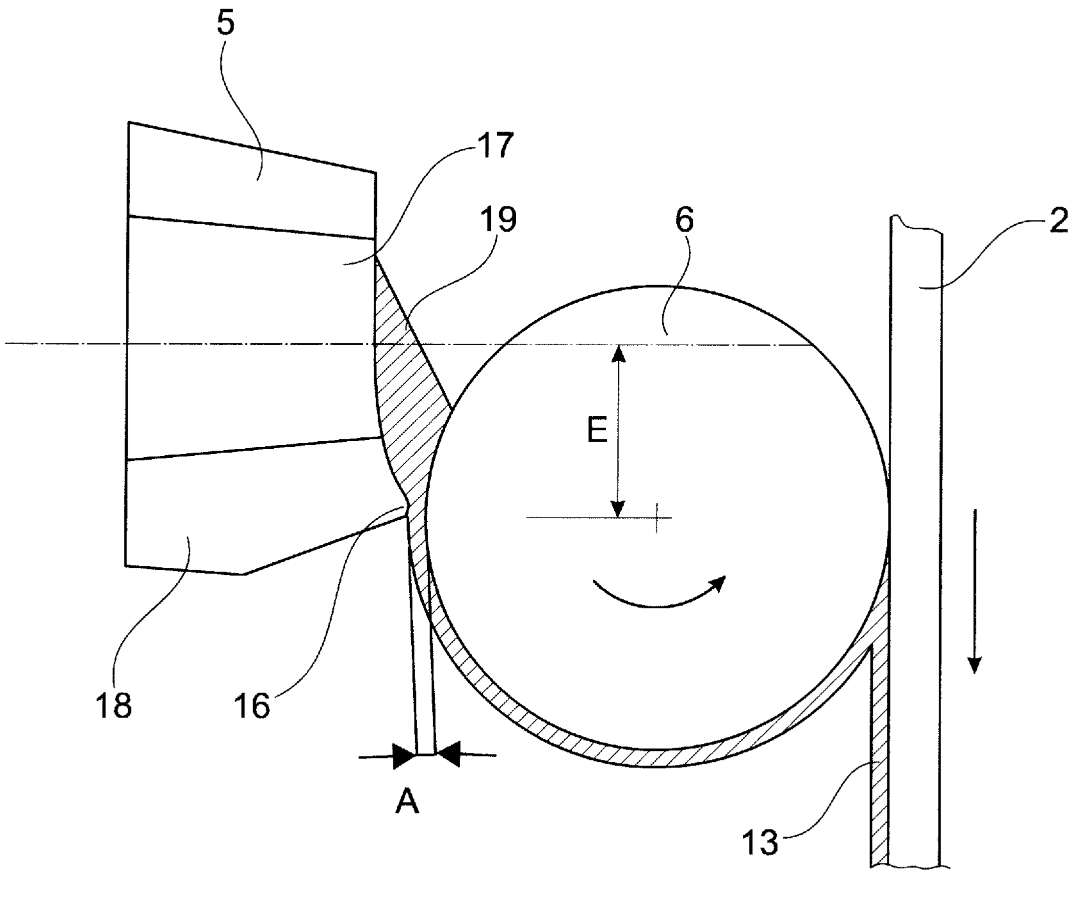
FIG. 3 is an enlarged sectional view of the device for applying the glue.

FIG. 3 is an enlarged view of a section through the device 15 for applying the glue track 13 with the strip 2 guided past said device. The device 15 comprises a nozzle 5 having an outlet opening 17, from which the glue emerges, and a roller 6 which is rotationally driven to rotate in the direction of the arrow and onto which the glue discharging from the outlet opening 17 is applied in the form of a glue track 13. This glue track 13 is then applied or rubbed onto the edge of the strip 2 by the roller 6. The roller 6 is driven counterclockwise in the illustration, while the strip 2 is moved vertically downwards. This results in opposite movements of the strip 2 and the roller 6 on the right-hand edge of the roller, i.e. on the edge of the roller 6 along which the strip 2 is guided. The relative speed between the strip 2 and the circumferential surface of the roller 6 thus results from the sum of the transport speed of the strip 2 and the circumferential speed of the roller 6, and the glue is applied to the strip 2 with a correspondingly increased relative speed.

In order to control the lengths and positions of the glue-free portions 14 in the glue track 13, the intermittent device 15 can be controlled in such a way that the duration of the interruption in the glue supply and the start and end of the interruption in the glue supply are changed, while the remaining parameters remain constant.

The nozzle 5 is arranged such that the centre of the outlet opening 17 is eccentrically offset by the dimension E with respect to the axis of rotation of the roller 6 upstream of the rotational movement of the opposite circumferential surface of the roller 6, i.e. counter to the transport direction of the strip 2. Furthermore, the nozzle 5 has, on the edge 18 thereof which is the lower edge in the illustration, i.e. arranged downstream with respect to the circumferential movement of the roller 6, an edge portion 16 protruding in the direction of the roller 6, by means of which the distance A between the edge 18 of the outlet opening 17 and the roller 6 is reduced and a constriction is formed. By means of this constriction, the glue is applied to the circumferential surface of the roller 6 in a glue track 13 with a correspondingly reduced thickness and is removed by the roller 6 before it is applied to the strip 2 as a glue track 13.

Due to the reduced distance A, the glue discharging from the outlet opening 17 is accumulated in a glue reservoir 19 before it is removed via the constriction. This deliberately formed glue reservoir 19, in combination with the intermittent glue supply through the nozzle 6, has the advantage that the length of the glue-free portions 14, in particular when using highly viscous glues having a viscosity of 230 mPas and in particular of 1,000 mPas and more, can be reduced to a length of 4 mm and less, which would otherwise not be possible at the high transport speed of the strip 2 with such a highly viscous glue. This is achieved by the glue reservoir 19 first being deliberately constructed during the glue supply. From the point at which the glue supply is interrupted, the glue then continues to be applied from the glue reservoir 19 to the roller 6 and via the roller to the strip 2 until the glue reservoir 19 is also emptied. Only then does the application of glue to the strip 2 end, such that the temporal and spatial start of the glue-free portion 14 on the strip 2 can be deliberately delayed further with respect to the interruption of the glue supply. This time delay in turn depends on the volume of the glue reservoir 19, which in turn can be changed by reducing or increasing the distance A. Since the roller 6 is mounted in a stationary manner with the axis of rotation thereof and the strip 2 is arranged at a constant distance from or in constant contact with the strip, there is also a change in the distance between the nozzle 5 and the strip 2. If the glue track 13 is applied directly to the strip 2 by the nozzle 5, the start and the length of the glue-free portions 14 can also be achieved in the same way by forming and changing the glue reservoir 19, which is formed directly between the nozzle 5 and the strip 2.

The volume of the glue reservoir 19 and thus the time delay in the interruption of the glue application can be controlled by the glue reservoir 19 being accumulated to a greater volume by reducing the distance A. Alternatively or additionally, the volume of the glue reservoir 19 and the glue application, and thus the length of the glue-free portions 14, can be controlled directly by changing the speed of the roller 6.

Controlling the length of the glue-free portions 14 by changing the distance A between the nozzle 5 and the roller 6 in particular has the advantage that the length of the glue-free portions 14 can be reduced to lengths of less than 4 mm, in particular to 2-3 mm, thereby, which at the high transport speeds of the strip of 100 m/min and more, in particular more than 400 m/min, is not possible solely by controlling the temporal interruption for mechanical reasons, due to the inertia of the closing mechanism in the intermittent device 15.

However, a glue application via the shown roller 6 has the additional advantage that the nozzle 5 does not or cannot come into contact with the strip 2 and therefore is not subject to closure. This is particularly advantageous because the nozzle 5 is a comparatively expensive component, and the costs for maintaining the production machine 1 can therefore be reduced since the required replacement intervals for the nozzle 5 can be lengthened considerably.

Furthermore, the application of glue via the roller 6 also makes a clean application of glue to very porous papers possible, and undesired penetration of the glue through the paper can in particular be prevented. Furthermore, the glue is applied by the nozzle 5 to the roller 6 in a contactless manner, such that, in terms of height and width, any amount of glue can be applied to the roller 6 and then further applied by the roller 6 to the strip 2. For example, an amount of glue of 150 g/500 m can be applied to the strip 2, which is not possible with the desired quality by a direct glue application via the nozzle 5 to the strip 2.

Furthermore, the application of the glue track 13 with the glue-free portions 14 counteracts the tendency for glue drips to form on the nozzle 5, since the nozzle 5 is practically "cleaned" at the outlet opening thereof at regular time intervals, due to the regular interruption of the glue supply as a result of the glue reservoir 19 "emptying".

The glue track 13 can be very narrow and applied to one of the edges, such that the products 3 are only adhesively bonded by a very narrow adhesive seam in a thin edge portion of the overlapping edges. If a stronger adhesive seam or a stiffer product 3 is to be produced, the glue track 13 can also be applied so as to be wider up to the entire width, i.e. in an application over the entire surface, and the products 3 can in this case be fixed in shape by placing the edges on top of one another and adhesively bonding same with wider edge portions to provide greater dimensional stability with a smaller diameter.

The invention claimed is:

1. A production machine for producing rod-shaped products from a continuous strand of a continuous strip adhesively bonded to form a tube, comprising: a device for applying a glue track to a strip, a format portion, in which the continuous strip can be formed into the continuous strand by shaping and adhesive bonding, and a cutting device which cuts the rod-shaped products from the continuous strand at a predetermined length, wherein the device for applying the glue track is formed by a device which applies the glue intermittently to form glue-free portions arranged at intervals, and a sensor apparatus is provided, which is directed towards the continuous strip or the continuous strand and generates a signal depending on the passage of a glue-free portion, the device for applying the glue track is designed to adjust and/or change the length of the glue-free portions in the longitudinal direction of the glue track, and wherein the device for applying the glue track is controlled depending on said signal from the sensor apparatus thereby adjusting and/or changing the length of the glue-free portions.

2. The production machine according to claim 1, wherein the device for applying the glue track has a controller for adjusting and/or changing the duration of the interruption of the glue application.

3. The production machine according to claim 1, wherein the device for applying the glue track has a nozzle, the distance (A) of which from the glue track to be applied can be changed.

4. The production machine according to claim 3, wherein the device for applying the glue track has a rotationally driven roller, to which the nozzle applies the glue track and which further applies the glue track to the continuous strip.

5. The production machine according to claim 4, wherein the nozzle has an edge portion delimiting the outlet opening and protruding in the direction of the roller, which edge portion is arranged on the edge of the outlet opening that is arranged downstream with respect to the direction of rotation of the roller.

6. The production machine according to claim 4, wherein the nozzle is arranged such that the centre of the outlet opening is eccentric to the axis of rotation of the roller, counter to the direction of rotation of the roller.

7. The production machine according to claim 4, wherein the roller is provided so as to be rotationally drivable in the opposite direction with respect to a transport direction of the continuous strip.

8. The production machine according to claim 4, wherein the glue has a viscosity greater than 230 mPas.

9. The production machine according to claim 1, wherein the sensor apparatus is arranged between the format portion and the cutting device.

10. The production machine according to claim 9, wherein the sensor apparatus is a high-frequency sensor apparatus.

11. The production machine according to claim 1, wherein the sensor apparatus is arranged between the device for applying the glue track and the format portion.

12. A method for operating a production machine according to claim 1, wherein the length of the glue-free portions can be adjusted and/or changed by adjusting and/or changing the duration of the interruption of the glue application and/or by adjusting and/or changing the distance of the device for applying the glue track on the strip, and/or wherein the production machine is designed such that the device for applying the glue track has a rotationally driven roller, to which the nozzle applies the glue track and which further applies the glue track to the continuous strip, and the adjustment and/or the change of the length of the glue-free portions is controlled by changing the speed of the roller.

13. The method according to claim 12, wherein the strip is transported at a transport speed of more than 100 m/min.

* * * * *